United States Patent [19]
Zimmerman

[11] Patent Number: 5,205,062
[45] Date of Patent: Apr. 27, 1993

[54] FISH LURE

[76] Inventor: Jeffery C. Zimmerman, 13238 N. Victor Hugo, Phoenix, Ariz. 85032

[21] Appl. No.: 813,445

[22] Filed: Dec. 26, 1991

[51] Int. Cl.⁵ .............................................. A01K 85/00
[52] U.S. Cl. .................................. 43/42.04; 43/42.02; 446/220
[58] Field of Search ................. 43/42.02, 42.04, 42.06, 43/42.22, 34, 35, 36, 37; 446/220, 226

[56] References Cited

U.S. PATENT DOCUMENTS

| 756,527 | 4/1904 | Reynolds | 43/42.02 |
|---|---|---|---|
| 1,430,642 | 10/1922 | Gross | 43/36 |
| 1,857,312 | 5/1932 | Kuehn | 43/42.02 |
| 2,698,496 | 1/1955 | Miller | 446/226 |
| 2,889,656 | 6/1959 | Zalonis | 43/37 |
| 3,266,185 | 8/1966 | Abramson, Jr. | 43/37 |
| 3,367,058 | 2/1968 | Dominique | 43/42.06 |
| 3,371,830 | 3/1968 | Parkman | 224/103 |
| 4,455,780 | 6/1984 | Keable | 43/42.04 |
| 5,049,106 | 9/1991 | Kim et al. | 446/220 |

Primary Examiner—Richard K. Seidel
Assistant Examiner—Chuck Y. Mah
Attorney, Agent, or Firm—Tod R. Nissle

[57] ABSTRACT

A fish lure which will not pierce the body of and injure a fish. The lure includes at least one contact surface which is shaped and dimensioned to distribute a force having a selected magnitude over the body of a fish such that the contact surface and the lure are prevented from piercing the body of the fish.

16 Claims, 5 Drawing Sheets

U.S. Patent  Apr. 27, 1993  Sheet 1 of 5  5,205,062
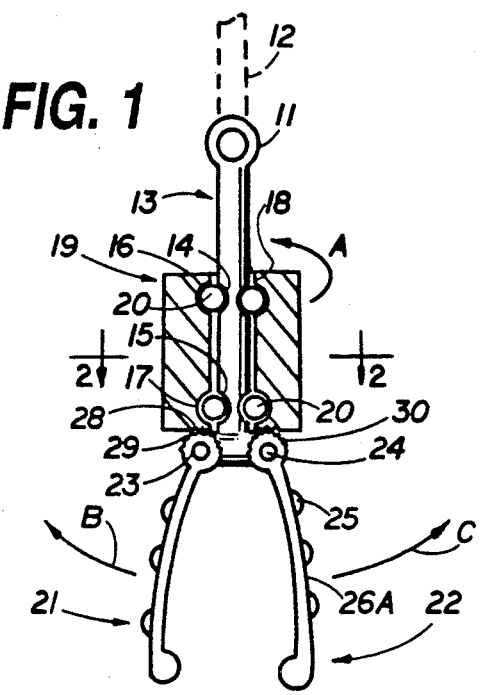
FIG. 1
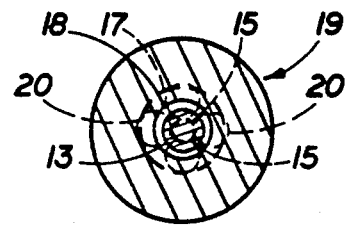
FIG. 2
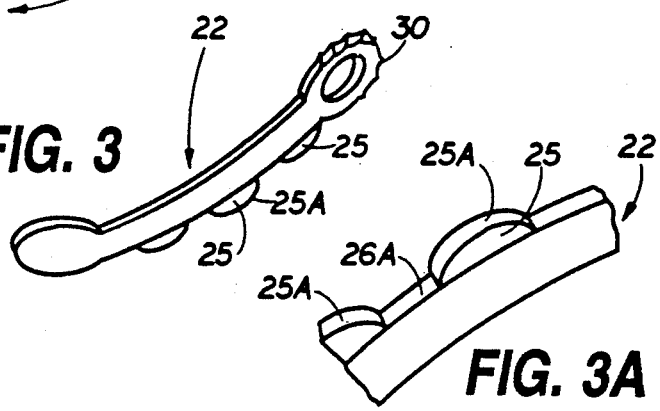
FIG. 3
FIG. 3A
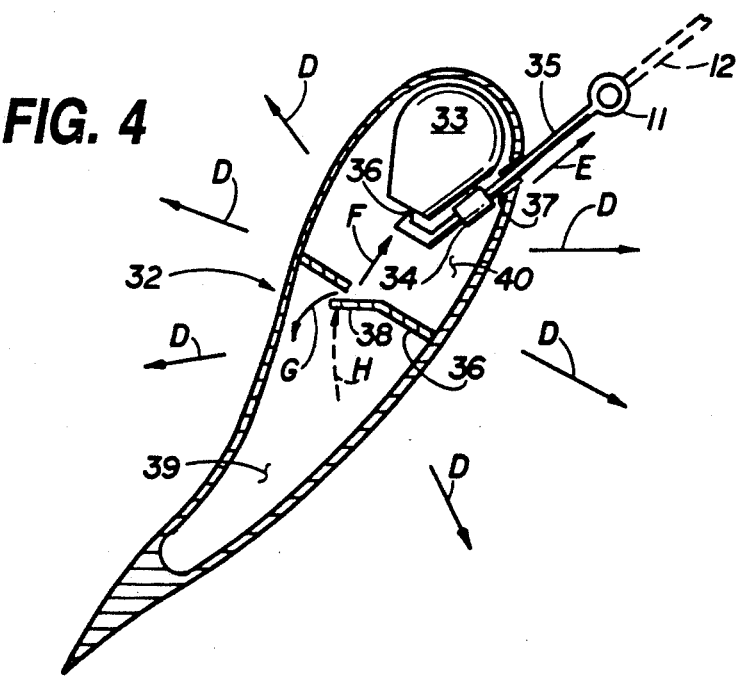
FIG. 4

FISH LURE

This invention relates to fish lures.

More particularly, the invention relates to a fish lure which will not pierce the body of and injure a fish.

Conventional fishhooks pierce the body of and injure a fish. See, for example, U.S. Pat. Nos. 2,897,624 to Yakel et al., 3,337,980 to Farajian et al., and 4,524,537 to Malchert, Sr. Piercing the body of a fish can cause irreparable injury to the fish or can make the fish susceptible to infection. When a fisherman returns a fish to a stream because the fish is too small or because the fisherman does not wish to make use of the fish, it is preferred that the fish survive and not die because of injuries received from a lure ingested by the fish.

Accordingly, it would be highly desirable to provide an improved fish lure which, in use, would not require that the lure pierce the body of the fish and which could be readily removed from a fish without significantly injuring the fish.

Therefore, it is a principal object of the invention to provide an improved fish lure.

Another object of the invention is to provide a fish lure which engages a fish and holds a fish on line without penetrating the body of the fish.

A further object of the invention is to provide a fish lure which, after being swallowed by a fish, expands and frictionally engages the body of the fish without piercing the body of the fish.

These and other further and more specific objects and advantages of the invention will be apparent to those skilled in the art from the following detailed description thereof, taken in conjunction with the drawings, in which:

FIG. 1 is a side view of a fish lure constructed in accordance with the principles of the invention;

FIG. 2 is a section view of the fish lure of FIG. 1 taken along section line 2—2 thereof and further illustrating internal construction details thereof;

FIG. 3 is a perspective view of one of the structural members of the lure of FIG. 1;

FIG. 4 is a section view of an inflatable lure;

Figure 5:
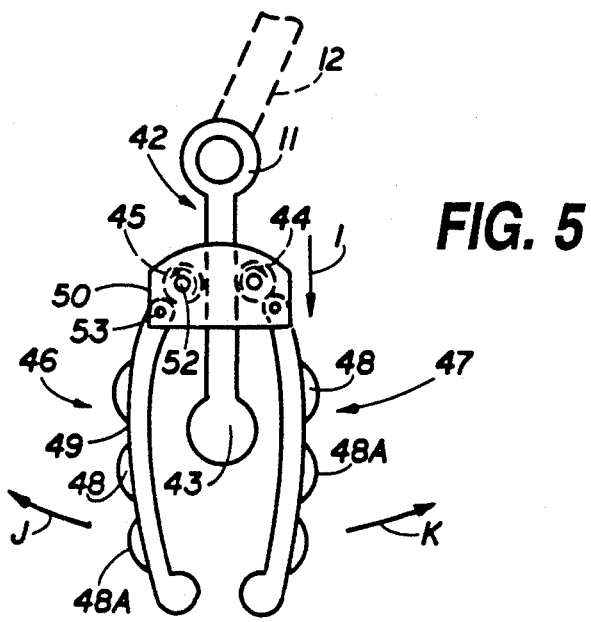
FIG. 5 is a front view of an alternate embodiment of the lure of the invention.

Briefly, in accordance with my invention, I provide an improved fish lure. The lure includes a body member; carrier means mounted on the body member; arm means; and, transmission means. The arm means includes at least a pair of elongate arms pivotally attached to the carrier means and movable between at least two operative positions, a first operative storage position, and a second deployed position with the arms outwardly pivotally displaced from the first operative position. The body member and the carrier means are movable with respect to one another. Each of the arms has at least one non-piercing contact surface shaped and dimensioned to contact the body of a fish when the arms are in the second operative position. The transmission means interconnects and is operatively associated with the body member and the arm means to transmit motive power to and move the arms from the first to the second operative position when one of the pair comprising the body and the carrier means moves with respect to the other of the pair. The arms are shaped and dimensioned such that when the lure has been ingested by a fish and the arms are in the second operative position the contact surfaces of the arms bear against and frictionally engage the body of the fish without piercing the body of the fish. The contact surfaces are the only portions of the arms bearing against the body of the fish when the arms are in the second operative position.

In another embodiment of my invention, I provide an improved fish lure including a body member having a longitudinal axis; a swivel member mounted on the body member for rotation about the longitudinal axis; at least a pair of arms each pivotally mounted to one of the pair comprising the body member, and the swivel member; and, transmission means. The arms are each movable between at least two operative positions, a first operative storage position and a second deployed position with the arms outwardly pivoted from the first operative position. Each of the arms includes at least one non-piercing contact surface shaped and dimensioned to contact the body of a fish when the arms are in the second operative position. The transmission means interconnects the arms and one of the pair consisting of the body member and the swivel member to transmit motive power from the said one of said pair to the arms to move the arms from the first to the second operative position when the swivel member rotates about the body member in a selected direction of travel.

In a further embodiment of my invention, I provide an improved fish lure including an inflatable body; a container of pressurized fluid connected to the body; and, means for releasing fluid from the container into the body to inflate the body.

Turning now to the drawings, which depict the presently preferred embodiments of the invention for the purpose of illustrating the practice thereof and not by way of limiting the scope of the invention, and in which like reference characters refer to corresponding elements throughout the several views, FIGS. 1 to 3 illustrate a fish lure constructed in accordance with the invention and including eyelet 11 through which fishing line 12 is secured. Elongate cylindrical body member 13 is connected to eyelet 11. U-shaped circular grooves 14, 15 are formed in and circumscribe member 13. U-shaped circular grooves 16 and 17 are formed in cylindrical aperture 18 which extends through cylindrical swivel member 19. Member 13 extends through aperture 18. Spherical ball bearings 20 are housed in groove pairs 14–16 and 15–17. Pins 23 and 24 pivotally secure the upper ends of arms 21 and 22 to the lower end of body member 13. Transmission or gear teeth 28 formed on the lower portion of swivel member 19 transmit motive power to teeth 29 and 30 formed on the upper ends of arms 21 and 22.

In operation, when a fish swallows the lure of FIG. 1, swivel member is sized to either be grasped by the mouth of the fish or to frictionally engage the inner body walls of the fish so that if the fish turns or rotates in the water in the direction of arrow A (or the reverse direction), member 19 rotates about member 13 and the longitudinal axis of member 13 in the direction indicated by arrow A. Ball bearings 20 permit and facilitate the rotation of member 19 about member 13. When member 19 rotates in the direction of arrow A from the position shown in FIG. 1, teeth 28 bear against teeth 29 and 30 and cause arms 21 and 22 to pivot about pins 23, 24 and be deployed in the directions indicated by arrows B and C, respectively. When arms 21 and 22 move outwardly in the directions of arrows B and C, smooth, arcuate contact surfaces 25A are pressed into the inner body walls of the fish. After arms 21 and 22 are deployed to positions against the inner walls of the fish, the span of the arms is great enough to prevent the arms from being pulled out of the mouth of the fish. Surfaces 25A can be fabricated from a material which frictionally engages the body of the fish or can be coated with a material which frictionally engages the body walls of the fish. If surfaces 25A are sufficiently pressed into the body walls of the fish, smooth substantially planar surface 26A may also frictionally engage the body walls of the fish. In the practice of the invention, it is important that members 25 are not pointed and that arms 21 and 22 are shaped and dimensioned so as not to pierce the body of the fish.

The embodiment of the invention illustrated in FIG. 4 includes an inflatable balloon--arm means 32 shaped like a tadpole or, if desired, like any other object or creature likely to be ingested by a fish. Pressurized gas container 33 is connected to the interior of balloon 32. Cylindrical body member or rod 35 is slidably received by sleeve 34 attached to container 33. The upper end of rod 35 is connected to eyelet 11 which receives fishing line 12. When line 12 and rod 35 are pulled in the direction of arrow E, rod 35 is pulled through sleeve 34 and puncture point 36 is driven through a seal (not visible) in the top of container 33 to release gas into balloon--arm means. Pressurized air from container 33 flows into chamber 40 and past flap 38 in the direction of arrow G into chamber 39. The gas released from container 33 causes balloon--arm means 32 to expand in the directions indicated by arrows D. In the event pressurized gas leaks out of chamber 40, gas attempting to flow from chamber 39 to chamber 40 acts against valve flap 38 in the direction of arrow H and seals gas in chamber 39 of balloon--arm means 32.

In operation of the lure of FIG. 4, when a fish ingests and pulls on balloon--arm means 32, pin 36 is driven into the seal of container 33 and gas is released into balloon--arm means 32. Balloon--arm means 32 expands against the inner walls of the fish and frictionally engages the walls of the fish to prevent balloon--arm means 32 from being regurgitated by the fish when the fish attempts to escape. The size of the expanded inflated balloon--arm means 32 can also prevent the means 32 from being pulled out of the mouth of the fish. Means 32 can be removed from a fish by deflating means 32 and pulling the means 32 out through the mouth of the fish.

Figure 6:
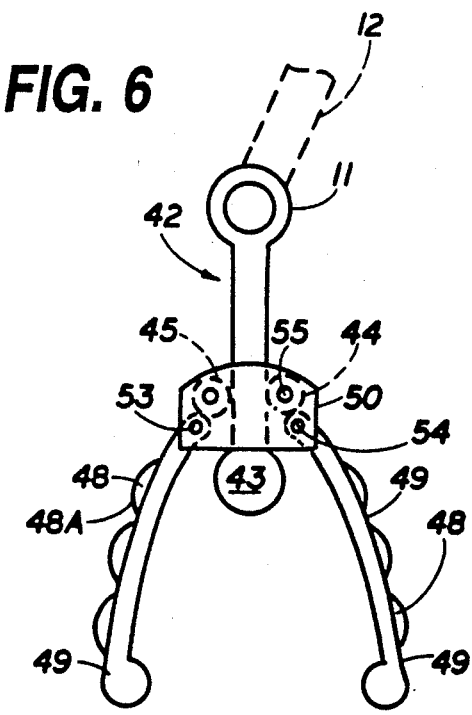
FIG. 6 is a front view of the lure of FIG. 5 illustrating the mode of operation thereof.
Figure 7:
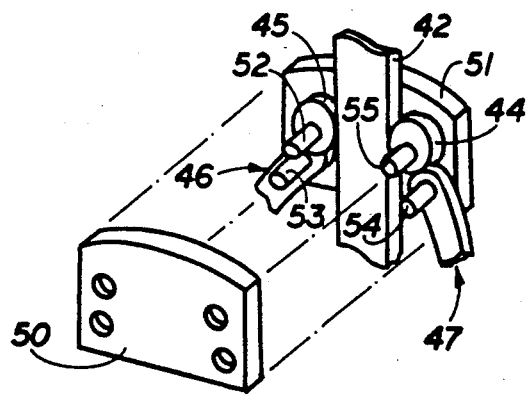
FIG. 7 is a partial exploded view of the lure of FIG. 5 illustrating internal construction details thereof.

The embodiment of the invention illustrated in FIGS. 5, 6, and 7 includes an elongate, flat body member 42 connected at its upper end to eyelet 11 which receives fishing line 12. Body member 42 slidably passes intermediate opposing, spaced apart, plates 50 and 51 (FIG. 7). The upper ends of arms 46 and 47 are pivotally secured intermediate plates 50 and 51 by pins 53 and 54. Cylindrical rollers 45 and 44 are secured intermediate plates 50 and 51 by pins 52 and 55, respectively. Rollers 44 and 45 can freely rotate about pins 55 and 52. Roller 44 contacts body member 42 and the upper end of arm 47. Roller 45 contacts body member 42 and the upper end of arm 46. Accordingly, when, in FIG. 5, plates 50 and 51 are displaced downwardly in the direction of arrow I, roller 45 rotates over member 42 in a counterclockwise direction and roller 44 rotates over member 42 in a clockwise direction. Roller 44 causes the upper end of arm 47 to pivot about pin 54 such that arm 47 moves outwardly in the direction of arrow K. Roller 45 causes the upper end of arm 46 to pivot about pin 53 such that arm 46 moves outwardly in the direction of arrow J. End 43 stops the movement of plates 50 and 51 in the direction of arrow I. After plates 50, 51 have moved from the position shown in FIG. 5 down body member 42 to the position shown in FIG. 6, arms 46 and 47 have been moved outwardly from the position shown in FIG. 5 to the position shown in FIG. 6.

In use of the lure illustrated in FIGS. 5, 6, and 7, a fish grasps plates 50, 51 and arms 46, 47 in its mouth. The weight of the fish pulling on plates 50 and 51 causes the plates to move from the position shown in FIG. 5 to the position shown in FIG. 6 such that arms 46 and 47 spread outwardly against, contact, and frictionally engage the inner walls of the fish. Arcuate contact surfaces 48A contact the walls of the fish. Surfaces 48A may comprise a friction coating applied to semicircular nubs 48. Alternately, nubs 48 may be formed from a material which frictionally engages the body of the fish without piercing the fish. When surfaces 48A are pressed into the body of the fish, substantially planar surface 49 can also frictionally engage the body of the fish. When arms 46 and 47 are extended in the manner shown in FIG. 6, the span of arms 46, 47 prevents the lure from being pulled out of the mouth of the fish.

Figure 8:
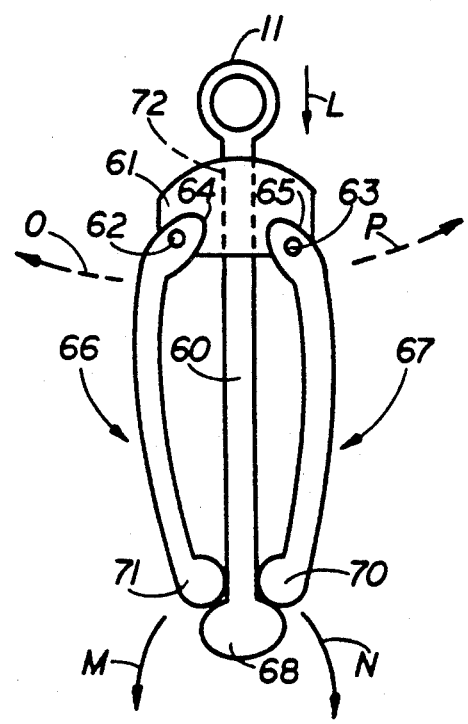
FIG. 8 is a front view of still another embodiment of a lure constructed in accordance with the invention.
Figure 9:
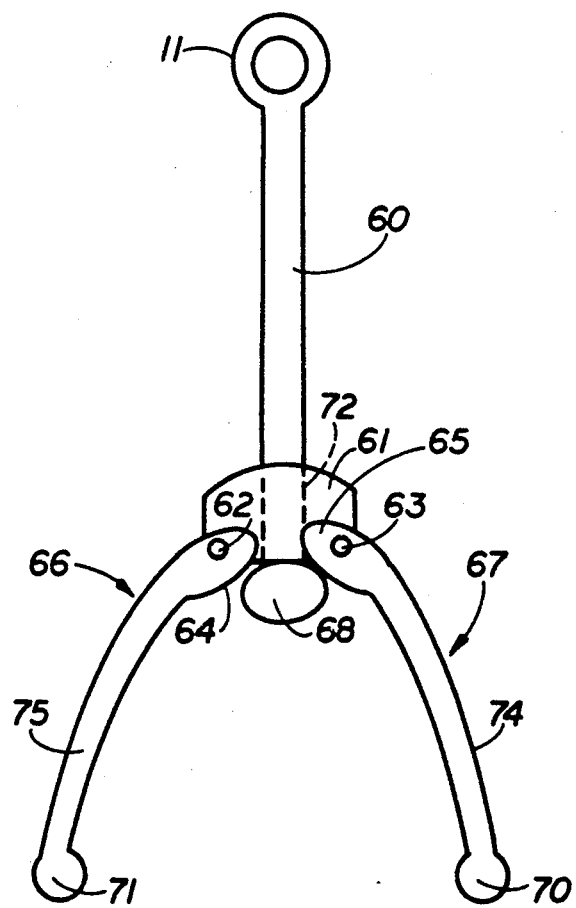
FIG. 9 is a front view of the lure of FIG. 8 illustrating the mode of operation thereof.

The embodiment of the invention illustrated in FIGS. 8 and 9 includes elongate cylindrical body member 60. The upper end of member 60 is attached to eyelet 11. The lower end of member 60 is attached to elliptical cam 68. Member 60 is slidably received by a cylindrical aperture 72 formed through carrier 61. The upper cam ends 64 and 65 of arms 66, 67 are pivotally attached to carrier 61 by pins 62 and 63, respectively. The lower circular ends 70 and 71 of arms 67, 66 rest against cam 68. When carrier 61 is displaced downwardly in the direction of arrow L from the position shown in FIG. 8, cam 68 causes circular ends 70 and 71 to slide outwardly and downwardly over cam 68 in the direction of arrows N and M, respectively. When carrier 61 has slid downwardly along member 60 in the direction of arrow L and is near cam 68, cam surfaces 64 and 65 slide over cam 68 to cause arms 66 and 67 to move outwardly further in the directions indicated by dashed arrows P and O in FIG. 8, until arms 66 and 67 reach the positions illustrated in FIG. 9. In FIG. 9, cam 68 halts the movement of carrier 61 in the direction of arrow L.

In use, a fish grasps in his mouth or ingests carrier 61 and legs 66, 67. The pull generated in the direction of arrow L on carrier 61 causes carrier 61 to be displaced in the direction of arrow L such that arms 66 and 67 open to the operative positions shown in FIG. 9. Arms 66 and 67 are flat panel arms similar to arms 21 and 22 in FIG. 1. The elongate, arcuate, generally planar contact surfaces 74, 75 of arms 66 and 67 contact and frictionally engage the inner body of the fish. Surfaces 74, 75 can be coated with a material which frictionally engages the body of the fish, or, arms 66, 67 can be fabricated from a material which frictionally engages the fish. It is preferred that the surfaces 74, 75 adhere to or engage the body of the fish without cutting or piercing the fish. When legs 66, 67 are in the position shown in FIG. 9, the span of the legs 66, 67 is too great to permit the lure to be pulled out through the mouth of the fish.

In the embodiment of the invention illustrated in FIG. 8, member 60 can be lengthened such that eyelet 11 is a greater distance from carrier 61. This would insure that the fish did not ingest eyelet 11 along with carrier 61 and arms 66, 67. Similarly, in FIG. 1, member 13 could be lengthened to increase the distance of eyelet 11 from swivel member 19, and, further, member 19 could be shaped and dimensioned or enlarged to insure that the body of the fish engaged member 19 when member 19 was ingested by the fish.

Figure 10:
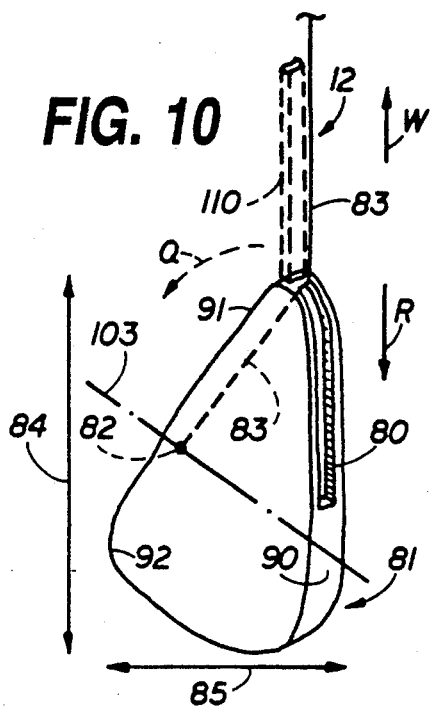
FIG. 10 is a front perspective view illustrating a cam lure constructed in accordance with the principles of the invention.
Figure 11:
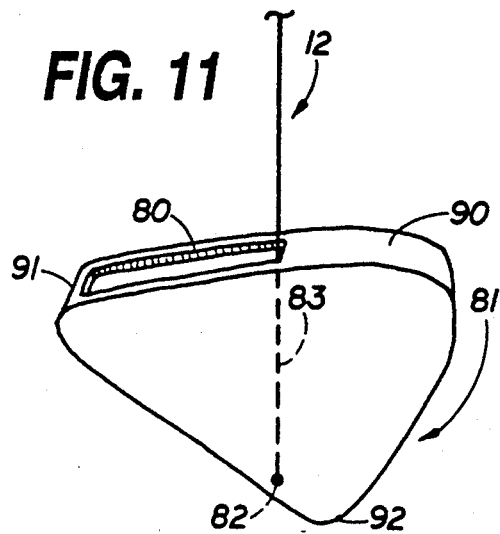
FIG. 11 is a front perspective view of the cam lure of FIG. 10 illustrating the mode of operation thereof.

FIGS. 10 and 11 illustrate a fish lure in which the lower end 83 of fishing line 12 functions as the body member of the lure. The lower end or body member 83 of the lure extends through elongate slot 80 formed in hollow wedge shaped cam--arm member 81. The distal end of body member 83 is fixedly secured to the inside of hollow member 81 at point 82. When a fish ingests the lure of FIG. 10, the pull by the fish on member 83 causes member 81 to rotate in the direction indicated by arrow Q to the orientation shown in FIG. 11. Member 81 is sized such that member 81 can be ingested by a fish when the member 81 is swallowed in the orientation shown in FIG. 10 and in a direction of travel R which is parallel to the longitudinal axis or length of the fish and to the longitudinal axis of member 81. The longitudinal axis of member 81 is parallel to arrows 84 when member 81 is in the orientation shown in FIG. 10. In FIG. 11, the longitudinal axis of member 81 is perpendicular to line 12. In other words, the width, indicated by arrows 85, of member 81 is small enough to fit through the mouth of the fish. However, once the member 81 is ingested and member 81 rotates about point 82 with respect to member 83 to the position illustrated in FIG. 11, then the length, indicated by arrows 84, of member 81 is sufficient to lodge contact surfaces 90 and 91 (and possibly 92) of the member 81 against the inner body of the fish and prevent member 81 from moving back out through the mouth of the fish. In FIG. 11, line 12 bears against one end of slot 80 and acts to prevent member 81 from continuing to rotate in the direction of arrow Q. Contact surfaces 90 and 91 also, when they contact the body of the fish, tend to halt the rotation of member 81 in the direction of arrow Q. The length 84 of member 81 is greater than the largest dimension of the opening defined and bounded by the fish's mouth. When member 81 is swallowed by a fish while in the orientation shown in FIG. 10, the longitudinal axis of member 81 is generally parallel to arrows 84 and R and to the longitudinal axis or tail-to-nose length of the fish. When member 81 is inside a fish in the orientation shown in FIG. 11, then the longitudinal axis of member 81 is generally perpendicular to line 12 and to the longitudinal axis or tail-to-nose length of the fish. The length 84 of member 81 is greater than the width 85 of member 81. Member 81 can be shaped and dimensioned such that when member 81 is pulled through the water at a selected trolling speed by line 12 in a selected direction, for example in the direction indicated by arrow W, the forces generated on member 81 by water flowing over and around member 81 generally maintain member 81 in the orientation shown in FIG. 10. Lures are often pulled through water at a trolling speed in the range of one to four miles per hour. Further, member 81 can be shaped and dimensioned such that when member 81 is pulled through the water at a selected trolling speed by line 12 in a selected direction, the forces generated on member 81 by water flowing over member 81 maintain member 81 in the orientation shown in FIG. 10, but when member 81 is stationary in the water, the forces of gravity acting on member 81 tend to cause member 81 to rotate in the direction of arrow Q (or in a direction opposite that of arrow Q).

A pliable strip of material 110 can be attached to member 81 to facilitate the removal of member 81 from within a fish.

Figure 12:
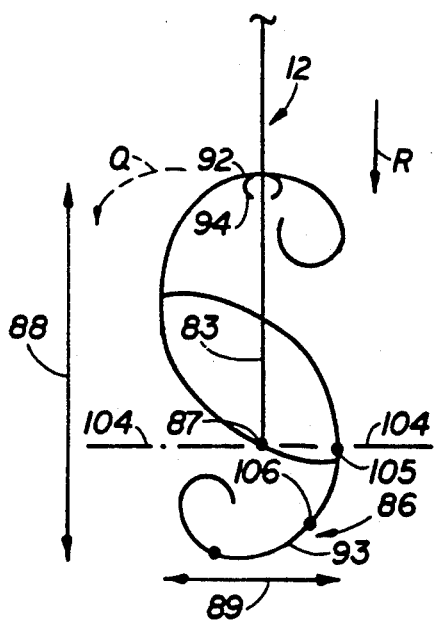
FIG. 12 is a front perspective view illustrating another cam lure constructed in accordance with the principles of the invention.
Figure 13:
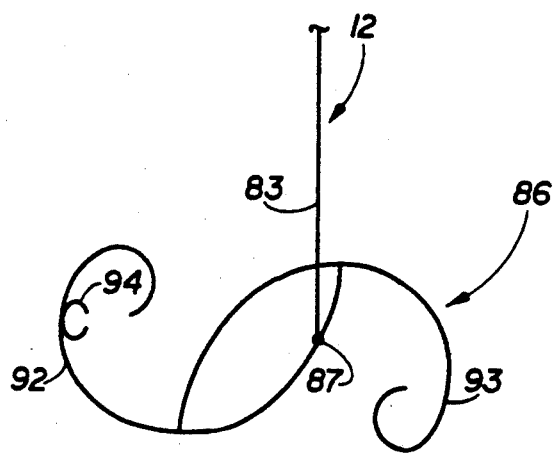
FIG. 13 is a front perspective view of the cam lure of FIG. 12 illustrating the mode of operation thereof; and, FIG. 14 is an elevation view of a spring leaf lure embodying the principles of the invention.

FIGS. 12 and 13 illustrate a lure in which the lower end 83 of the fishing line 12 also serves as the body member of the lure. The distal end of body member 83 is attached to S-shaped arm means 86 at point 87. Arm means 86 is made from cylindrically shaped wire, but can be fabricated from strips of material having an elliptical cross section, square cross section, etc. or having any other shape and dimension. When arm means 86 is ingested by a fish, the pull by the fish on arm means 86 causes line 12 to pull free from eyelet 94 and causes arm means 86 to rotate inside the fish in the direction of arrow Q to the position shown in FIG. 13. Arm means 86 is sized such that arm means 86 can, when the arm means is in and maintains the orientation shown in FIG. 12, be swallowed by a fish in the direction of travel R which is parallel to the longitudinal axis or length of the fish and which is parallel to the longitudinal axis of member 86. The longitudinal axis of arm means 86 is parallel to arrows 88 when arm means 86 is in the orientation shown in FIG. 12. In FIG. 13, the longitudinal axis of arm means 86 is perpendicular to line 12. In other words, the width, indicated by arrows 89, of member 81 is small enough to fit through the mouth of the fish. However, once the arm means 86 is ingested and arm means 86 rotates in the direction of arrow Q (or in a direction opposite that indicated by arrow Q) about point 87 with respect to member 83 to the position illustrated in FIG. 13, then the length, indicated by arrows 88, of arm means 86 is sufficient to lodge the contact surfaces 92, 93 of arm means 86 in the body of the fish and prevent arm means 86 from moving back out through the mouth of the fish. When contact surfaces 92 and 93 lodge against the body of the fish, the contact surfaces 92 and 93 halt the rotation of arm means 86 in the direction of arrow Q. The length 88 of arm means 86 is greater than the size of the fish's mouth. When arm means 86 is swallowed by a fish while in the orientation shown in FIG. 12, the longitudinal axis of arm means 86 is generally parallel to arrows 88 and R and to the longitudinal axis or tail-to-nose length of the fish. When arm means 86 is inside a fish in the orientation shown in FIG. 13, then the longitudinal axis of arm means 86 is generally perpendicular to line 12 and to the longitudinal axis or tail-to-nose length of the fish. The length 88 of arm means 86 is greater than the width 89 of arm means 86. If desired, the distal end of body member 83 can be attached to arm means 86 at point 105 instead of point 87. Such an "off-center" attachment of member 83 to point 105 facilitates the rotation of means 86 in the direction of arrow Q. Attaching the distal end of member 83 at a point which is lower than point 87 on means 86, i.e., at point 106, also facilitates the rotation of the means 86 either in the direction of arrow Q or in a direction opposite that of arrow Q.

In the lure illustrated in FIG. 10, the mass of the portion of member 81 above point 82 and reference line 103 is preferably, but not necessarily, greater than the mass of the lure below line 103. This facilitates the rotation of the lure in the direction of arrow Q when the lure is ingested by a fish. Similarly, in the lure of FIG. 12, the mass of the portion of arm means 86 above point 87 and reference line 104 is preferably, but not necessarily, greater than the mass of the lure below line 104. An "off-center" attachment of member 83 to arm means 86 at point 105 can facilitate the rotation of the lure in the direction of arrow Q even when the mass of the portion of arm means 86 above line 104 is equal to or less than the mass of the portion of arm means below line 104.

Figure 14:
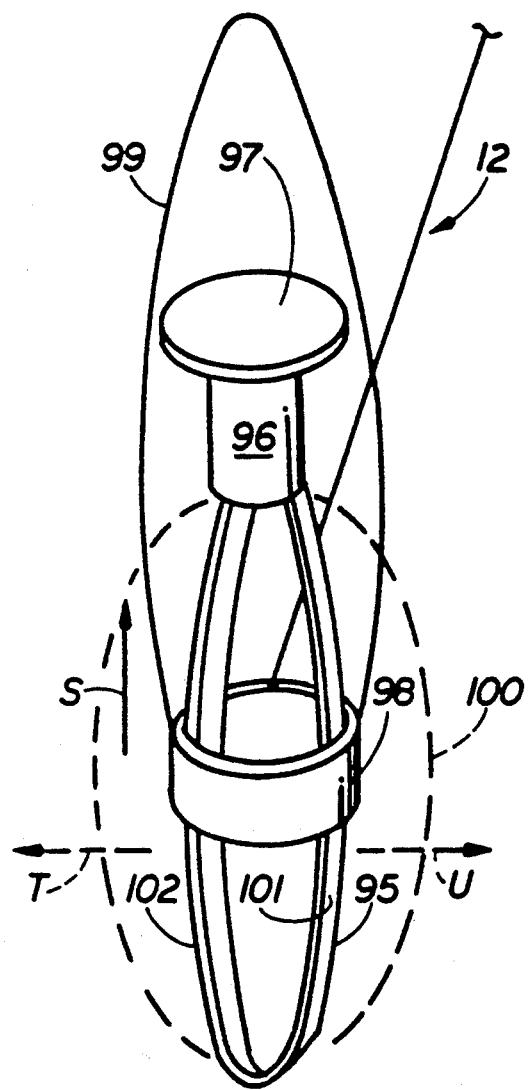

The embodiment of the invention illustrated in FIG. 14 includes leaf spring 95 attached at its ends to cylindrical body member 96. Flat circular panel member 97 is fixedly attached to body member 96. Panel member 97 is sized to prevent cylindrical ring 98 from being pulled over member 97. The ends of U-shaped wire 99 are attached to ring 98. Fishing line 12 is also attached to ring 98. Ring 98 compresses resilient leaf spring when ring 98 is positioned in the manner shown in FIG. 14. In use, when a fish ingests the lure of FIG. 14, the tension on line 12 pulls ring 98 upwardly over spring 95 in the direction of arrow S until ring 98 is stopped by and bears against member 97. After ring 98 is pulled off of spring 95, spring 95 outwardly resiliently expands of its own accord in the directions indicated by arrows U and T and takes on the shape indicated by dashed lines 100. When spring 95 takes on the shape indicated by dashed lines 100, contact surfaces 101 and 102 bear against the body of the fish. Further, when spring 95 takes on the shape indicated by dashed lines 100, the spring is too large to pass out through the mouth of the fish, and the spring therefore secures the fish at the end of line 12. In order to remove the lure of FIG. 14 from a fish, wire 99 is used to push ring 98 from body 96 down over the leaf spring 95 to resiliently compress and return the spring 95 to the position shown in FIG. 14.

The contact surfaces and lures utilized in the various embodiments of the invention illustrated in the drawings herein can take on any desired shape and dimension, provided that the contact surfaces have a sufficient area to distribute over the body of the fish a "strike" force having a selected magnitude such that the contact surfaces and lure do not pierce the body of the fish. As used herein, the "strike" force is the greatest force which the contact surfaces ordinarily distribute over inner body areas of the fish when a fish attempts to pull free from the line and lure after the fish has ingested the lure and when the line is not being let out or pulled in (i.e., the length of the line from the rod to the fish is not changing) by a fisherman. The magnitude of such a force for a particular type of fish is readily determined. The determination of the magnitude of such forces accounts for the recommendation that certain strengths of fish line be utilized when fishing for particular types of fish. A principal object of the invention is to provide a lure which will retain a fish at the end of a line without requiring that the fish be pierced by the lure. In order to prevent the contact surfaces from piercing the body of the fish, the contact surfaces must distribute the strike forces over a large enough inner area of the fish to prevent the contact surfaces from piercing the body of the fish.

Having described my invention in such terms as to enable those skilled in the art to understand and practice it, and having identified the presently preferred embodiments thereof, I claim:

1. A fish lure including
  (a) a body member attached to a length of fish line;
  (b) at least one arm member attached to said body member and movable between at least two operative positions,
    (i) first operative storage position for ingestion by a fish, and
    (ii) a second deployed position with said arm member displaced from said first operative position and extending outwardly from said body member in a curvilinear orientation after said lure is ingested by the fish;
  (c) at least one arcuate convex contact surface on said arm member;
  said arm member and said contact surface being shaped and dimensioned such that
    when said lure is ingested by a fish and said arm member is in said second operative position said arcuate contact surface bears against and engages the body of the fish to prevent said lure from being withdrawn from said fish; and
  said contact surface distributes a force having a selected magnitude over the body of the fish to prevent said contact surface and said lure from piercing the body of the fish.

2. The lure of claim 1 wherein
  (a) said arm member comprises a spring which is inwardly resiliently compressed in said first operative position and is, when said lure is ingested by the fish, released to move outwardly from said first operative position to said second operative position;
  (b) said contact surface comprises an outer surface of said spring; and
  (c) said contact surface is pressed against the body of the fish when said arm member moves from said first operative position to said second operative position.

3. The lure of claim 2 wherein said spring is a leaf spring.

4. The lure of claim 1 wherein
  (a) said arm member is attached to said body member to pivot about a selected axis;
  (b) said body member includes
    (i) neck (13) having a longitudinal axis at an angle to said selected pivot axis of said arm member; and,
    (ii) a collar member (19) mounted for rotation about said longitudinal axis of said neck and interconnecting said body member and said arm member to transmit motive power to pivot said arm member about said selected axis from said first to said second operative position when said collar member (19) rotates about said longitudinal axis of said neck (13).

5. The lure of claim 1 wherein
  (a) said arm member rotates about a selected pivot point on said body member when said arm member moves from said first operative position to said second operative position; and,
  (b) said arcuate contact surface directly contacts the side of the fish.

6. The lure of claim 1 wherein after said lure is ingested, said lure generally only contacts said fish at points on said arcuate convex contact surface.

7. A fish lure including
(a) a body member (83) having
 (i) an upper end attached to a length of fish line (12), and
 (ii) a lower end;
(b) a cam--arm member (81) having
 (i) a top portion,
 (ii) a bottom, said bottom and said lower end of said body member being pivotally attached at a pivot point (82), said pivot point being at a selected location on each of said cam--arm member (81) and said body member (83),
 (iii) a length (84), and
 (iv) a width (85), said length being greater than said width, said width being a dimension which can pass transversely through the mouth of a fish, said length being a dimension which can not pass transversely through the mouth of a fish, and
 (v) a longitudinal axis generally parallel to said length (84),
said cam--arm member (81) movable between two operative positions,
 (i) a first operative storage position for ingestion by a fish with said longitudinal axis generally parallel to said fish line 12, said top portion being adjacent said upper end of said body member (83) when said cam--arm member is in said first operative position, and
 (ii) a second operative deployed position with said cam--arm member rotatably displaced about said pivot point from said first operative storage position after said lure is ingested by the fish, said top portion being spaced away from said upper end of said body member (83) when said cam--arm member is in said second operative position; and,
(c) at least one contact surface on said cam--arm member;
said cam--arm member and said contact surface being shaped and dimensioned such that when said lure is ingested through the mouth of a fish when said lure is in said first operative position, contact of said cam--arm member with the body of the fish causes said cam--arm member to rotate about said pivot point and be displaced from said first to said second operative position, and
said longitudinal axis of said cam--arm member to rotate about said pivot point to an angle with respect to said fish line such that said contact surface bears against the body of the fish to prevent said cam--arm member from being drawn out through the mouth of the fish.

8. The fish lure of claim 7 wherein said cam--arm member is shaped and dimensioned such that said cam--arm member remains in said first operative position when said lure is pulled through water at a speed of one to four miles per hour.

9. The fish lure of claim 7 wherein when said cam--arm member is in said first operative position the mass of the portion of the lure extending from said pivot point outwardly to said upper end of said body member (83) has greater mass than the portion of the lure extending outwardly from said pivot point away from said upper end of said body member (83).

10. The fish lure of claim 7 wherein said selected locations of said pivot point in said body member and in said cam--arm member generally remaining fixed when said cam--arm member rotates from said first to said second operative position.

11. The fish lure of claim 7 wherein said cam--arm member (81) is shaped and dimensioned such that said cam--arm member moves from said first operative position to said second operative position under the force of gravity when said fish lure is stationary in water.

12. The lure of claim 7 wherein said cam-arm member comprises a unitary member.

13. The lure of claim 7 wherein said cam--arm member generally retains its shape and dimension when rotated from said first to said second operative position.

14. The lure of claim 7 wherein said body member (83) comprises a length of fish line.

15. A fish lure including
(a) an inflatable expandable body attached to a length of fishing line;
(b) a container of pressurized fluid connected to and in fluid communication with said body; and,
(c) means for releasing fluid from said container to inflate said body after said body is ingested by a fish;
said body having two operative configurations,
 (i) a first operative non-inflated configuration, said body being shaped and dimensioned in said first operative configuration to attract and be ingested by fish; and,
 (ii) a second operative inflated enlarged configuration, said body expanding to said second configuration from said first configuration after fluid is released from said container to inflate said body,
said body, when in said second operative configuration, being shaped and dimensioned to contact and bear against the body of the fish and distribute a force having a selected magnitude over the body of the fish to prevent said body from piercing the body of the fish and to prevent said body from being withdrawn from the fish.

16. The fish lure of claim 15 wherein said means for releasing fluid from said container is actuated when the fish ingests said body and tensions said fishing line.

* * * * *